(12) United States Patent
Mottier et al.

(10) Patent No.: US 8,290,018 B2
(45) Date of Patent: Oct. 16, 2012

(54) METHOD FOR EFFICIENT EQUALIZATION IN A TELECOMMUNICATION SYSTEM INCLUDING AT LEAST ONE MOBILE TRANSCEIVER

(75) Inventors: David Mottier, Rennes Cedex 7 (FR); Damien Castelain, Rennes Cedex 7 (FR)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 2428 days.

(21) Appl. No.: 10/815,724

(22) Filed: Apr. 2, 2004

(65) Prior Publication Data

US 2005/0009544 A1    Jan. 13, 2005

(30) Foreign Application Priority Data

Apr. 4, 2003  (EP) .................................. 03290844

(51) Int. Cl.
*H04B 1/00* (2006.01)
(52) U.S. Cl. ........ 375/130; 375/148; 375/146; 375/142; 375/150; 375/144
(58) Field of Classification Search .................. 375/130, 375/229, 219, 232, 221, 295, 316, 148, 146, 375/142, 144, 150, 376; 455/73, 76, 77, 455/95, 114.2, 114.3, 126, 130
See application file for complete search history.

(56) References Cited

U.S. PATENT DOCUMENTS

| | | | | |
|---|---|---|---|---|
| 6,363,102 B1* | 3/2002 | Ling et al. | | 375/147 |
| 6,512,737 B1* | 1/2003 | Agee | | 370/208 |
| 6,542,562 B1* | 4/2003 | Ostberg et al. | | 375/350 |
| 6,563,861 B1* | 5/2003 | Krasny et al. | | 375/150 |
| 6,654,408 B1* | 11/2003 | Kadous et al. | | 375/148 |
| 6,680,969 B1* | 1/2004 | Molnar et al. | | 375/224 |
| 6,785,351 B1* | 8/2004 | Qiu | | 375/346 |
| 6,850,505 B1* | 2/2005 | Ostberg | | 370/335 |
| 6,965,753 B1* | 11/2005 | Miller et al. | | 455/12.1 |
| 6,983,125 B2* | 1/2006 | Smee et al. | | 455/63.1 |

(Continued)

FOREIGN PATENT DOCUMENTS

FR    2 823 623    10/2002

OTHER PUBLICATIONS

Dong Geun Jeong, Myoung Jin Kim, Effects of Channel Estimation Error in MC-CDMA/TDD Systems, 2000, IEEE, 1773-1777.*

(Continued)

*Primary Examiner* — Kenneth Lam
(74) *Attorney, Agent, or Firm* — Oblon, Spivak, McClelland, Maier & Neustadt, L.L.P.

(57) ABSTRACT

The present invention relates to a method for transmitting data Di in a telecommunication system SYST including a first transceiver TXi and a second transceiver RX linked together by means of a communication channel Chi, one of which transceivers being mobile, which method includes:
  a spreading step for spreading said data Di over a plurality of components Ctj (for j=1 to M), and
  an equalization step during which each component Ctj (for j=1 to M) is multiplied by an equalization value Wi(j)* representative of communication conditions within the communication channel Chi.

According to the invention, the equalization values Wi(j)* are also representative of a Doppler effect generated by movement of the mobile transceiver.

The invention enables to significantly compensate for alterations caused to the communication channel Chi by movement of the mobile transceiver.

8 Claims, 2 Drawing Sheets

U.S. PATENT DOCUMENTS

| | | | | |
|---|---|---|---|---|
| 7,035,315 B2* | 4/2006 | Sung | | 375/147 |
| 7,286,593 B1* | 10/2007 | Banerjee | | 375/148 |
| 2002/0191568 A1* | 12/2002 | Ghosh | | 370/335 |
| 2003/0076872 A1* | 4/2003 | Jalloul et al. | | 375/141 |
| 2003/0078025 A1* | 4/2003 | Smee et al. | | 455/307 |
| 2003/0123384 A1* | 7/2003 | Agee | | 370/208 |
| 2003/0236072 A1* | 12/2003 | Thomson | | 455/63.1 |
| 2005/0018641 A1* | 1/2005 | Zhao et al. | | 370/342 |
| 2005/0100079 A1* | 5/2005 | Sanada et al. | | 375/141 |

OTHER PUBLICATIONS

Won Gi Jeon, et al., "An Equalization Technique for OFDM and MC-CDMA in a Time-Varying Multipath Fading Channels", Acoustics, Speech, and Signal Processing, IEEE, Apr. 21, 1997, pp. 2529-2532.

Zhiyong Pu, et al., "Transmission and Recepction of TDD Multicarrier CDMA Signals in Mobile Communications System", Vehicular Technology Conference, IEEE, May 16, 1999, pp. 2134-2137.

* cited by examiner

METHOD FOR EFFICIENT EQUALIZATION IN A TELECOMMUNICATION SYSTEM INCLUDING AT LEAST ONE MOBILE TRANSCEIVER

The present invention relates to a method for transmitting data in a telecommunication system including at least a first and a second transceiver linked together by means of at least one communication channel, at least one of which transceivers being mobile, which method includes the following steps:
 a spreading step for spreading said data over a plurality of components, and
 an equalization step in the course of which each of the components resulting from the spreading step is multiplied by a predetermined equalization value representative of communication conditions within the communication channel.

Such a method has been described in an IEEE publication entitled "SINR-Based Channel Pre-equalization for Uplink Multi-Carrier CDMA systems", published on September 2002 and authored by Mm. David Mottier and Damien Castelain. According to this publication, the equalization step is intended to be carried out by a transmitting transceiver in order to apply a pre-distortion to signals to be transmitted by said transmitting transceiver, so that distortions generated by the communication channel will be compensated for beforehand by said pre-distortion.

The pre-distortion described in this publication is to be achieved by multiplying each of the components resulting from the spreading step by an equalization value computed on the basis of prior knowledge of communication conditions within the communication channel.

Such prior knowledge may result from an analyzis of an incoming signal previously received by said transceiver, whose alterations will be observed by this transceiver and will enable to modelize the communication conditions within the communication channel. The resulting model is usually expressed in the form of a plurality of channel coefficients, each of which being dedicated to a given component of the spread signal, and being used for computing the equalization value to be applied to said component.

A problem arises, however, when said transceiver is subject to movement with such a velocity that the model of the communication channel generated on the basis of a previous incoming signal as described above may become at least partially obsolete, so that the compensation which should be achieved through the equalization step on the basis of previously computed equalization values may be inaccurate or inefficient.

In particular, some components may be subjected to what will actually turn out to be an overcompensation, while the effect of the communication channel on other components will be insufficiently compensated for and will thus leave these other components significantly distorted and/or able to distort other components. Furthermore, since applying a compensation is power-consuming, an overcompensation will constitute a waste of energy, which energy is often in limited supply since it is usually stored in a battery attached to the mobile transceiver.

The known method may thus prove to be underperforming, both in terms of communication quality and in terms of energy consumption.

The present invention aims at solving the aforementioned problems, by providing a method for transmitting data in which a possible obsolescence of equalization values due to movement of a mobile transceiver is recognized and compensated for.

Indeed, a method as described in the opening paragraph is characterized according to a first, software-related aspect of the present invention, in that at least one predetermined equalization value is also representative of a Doppler effect resulting from a movement of the mobile transceiver and adversely affecting the communication conditions within the communication channel.

The invention enables to take into account alterations caused to the communication channel by movement of the transceiver by integrating into the relevant equalization value or values a quantification of the Doppler effect caused by said movement. Such a provision allows for a dynamic tuning of said relevant equalization value or values with respect to the movement of the transceiver, and reduces the risk for said equalization value or values to become obsolete, which in turn enhances the performance, both in terms of communication quality and in terms of energy consumption, of the compensation achieved by means of the equalization step.

According to a specific embodiment of this first aspect of the invention, in which each predetermined equalization value includes a parameter representative of a noise level in said communication channel, said predetermined equalization value will further include an additionnal noise parameter representative of said Doppler effect.

As will be more thoroughly described hereinafter, this specific embodiment enables to use an already existing computing scheme for providing compensation of the Doppler effect, which will limit the increase in computing power required for implementing the present invention.

According to a first variant of this specific embodiment, in which the communication conditions within the communication channel are modelized by means of a study of the effects of said conditions on at least one incoming signal previously received by the mobile transceiver through said communication channel, the additionnal noise parameter representative of said Doppler effect will feature a variance intended to increase with an amount of time elapsed since said incoming signal has been received by the mobile transceiver.

An incoming signal such as that described hereinbefore may not be known by the transceiver beforehand, in which case said transceiver will perform a so-called blind estimation of the communication channel. The incoming signal will preferably consist in a pilot signal whose value will be known beforehand by the transceiver, which will enable it to perform a so-called pilot-based channel estimation, which yields more accurate results than a blind estimation.

The above described first variant takes into account the age of the model of the communication channel which has been generated on the basis of a previously received incoming signal, and provides increasing compensation as the age of the model increases.

This first variant thus provides a highly satisfying accuracy, which is however obtained at the cost of a high computing power required for updating the value of the additionnal noise parameter representative of the Doppler effect.

According to a second variant of the above-described specific embodiment, the additionnal noise parameter representative of said Doppler effect will feature a constant variance whose value has been averaged over a time interval between two successive incoming signals such as those described above.

This second variant, though slightly less accurate than the first one described above, will nevertheless enable an adequate compensation of the Doppler effect while requiring less computing power, i.e. only the computing power necessary for computing a single average value for the variance of the additional noise parameter for each time interval between two successive incoming signals.

As explained above, the equalization step included in the method according to the invention may be pre-emptively carried out by a mobile transceiver on components of a signal intended to be transmitted by said mobile transceiver.

Alternatively or cumulatively, such an equalization step may also be carried out by a mobile transceiver on components of a signal received by said mobile transceiver, for example from a radio base station, in order to compensate for distortion actually generated by the communication channel through which said signal has been received.

According to a second, hardware-related aspect, the present invention also relates to a telecommunication system including at least a first and a second transceiver linked together by means of at least one communication channel, at least one of which transceivers being mobile, which system includes:
  spreading means for spreading data to be transmitted through said communication channel over a plurality of components, and
  equalization means intended to multiply each of the components outputted by the spreading means by a predetermined equalization value representative of communication conditions within the communication channel,
telecommunication system characterized in that at least one predetermined equalization value is also representative of a Doppler effect resulting from a movement of the mobile transceiver and adversely affecting the communication conditions within the communication channel.

In such a telecommunication system, equalization means may be arranged upstream of a transmitting stage in a mobile transceiver, and intended to pre-emptively process components of a signal to be transmitted by said transmitting stage. Alternatively or cumulatively, such equalization means may be arranged downstream of a receiving stage in a mobile transceiver, and intended to process components of a signal received by said receiving stage.

The invention thus also relates to a mobile transceiver, in which equalization means such as those described above are arranged upstream of a transmitting stage, and intended to process components of a signal to be transmitted by said transmitting stage.

The invention further relates to a mobile transceiver, in which equalization means such as those described above are arranged downstream of a receiving stage, and intended to process components of a signal received by said receiving stage.

The invention also relates to a radio signal transmitted through a communication channel by means of a telecommunication system or by use of a method as described above.

The characteristics of the invention described above, as well as others, will emerge more clearly from a reading of the following description given in relation to the accompanying figures, amongst which:

Figure 1:
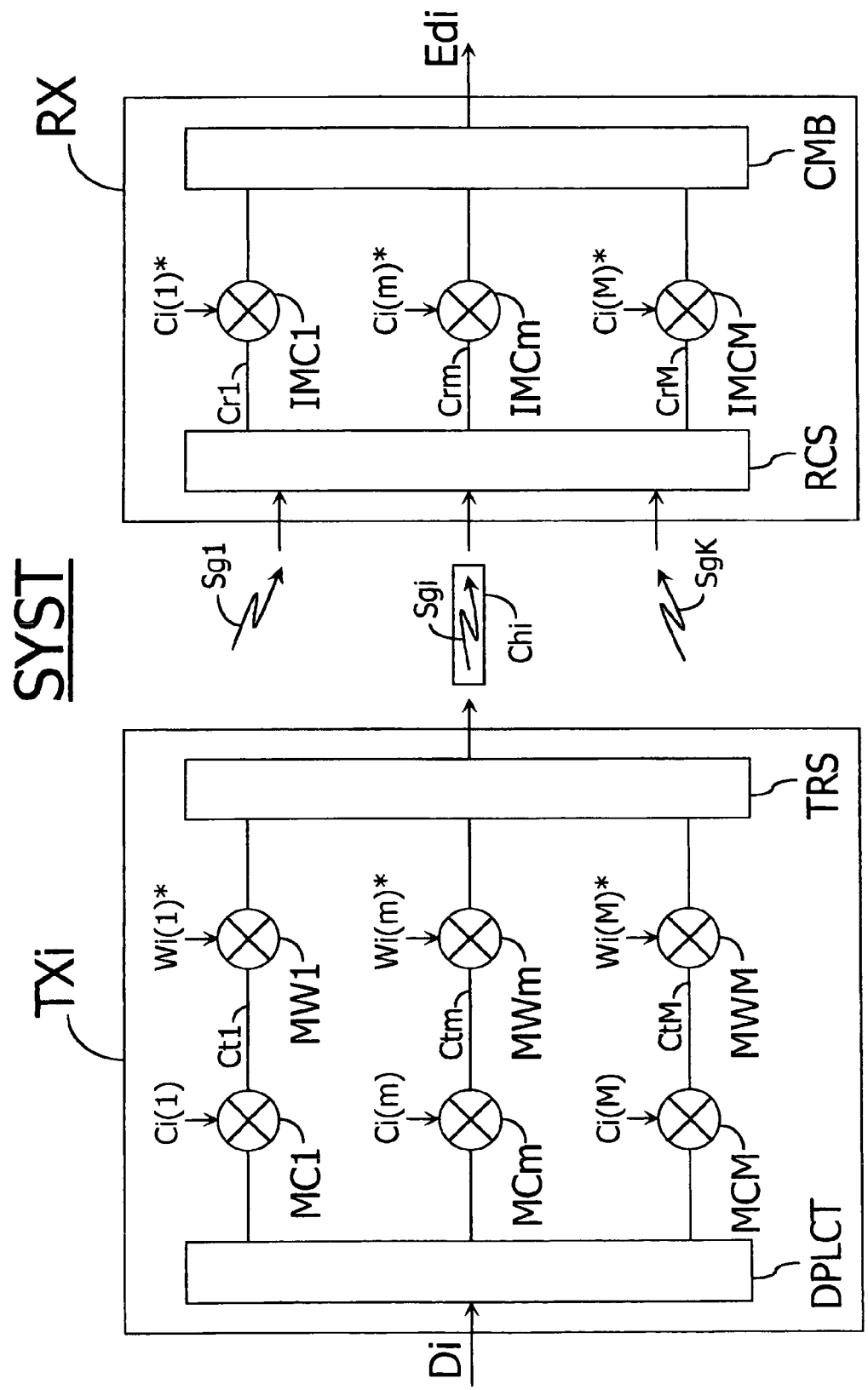
FIG. 1 is a block diagram, which schematically depicts a telecommunication system according to the present invention.

FIG. 1 schematically depicts a telecommunication system SYST including a first transceiver, for example a mobile radio terminal, and a second transceiver RX, for example a radio base station or another mobile radio terminal. The first and second transceivers TXi and RX are linked together by means of a communication channel Chi, through which the first transceiver TXi is intended to transmit a radio signal Sgi to the second transceiver RX.

In this embodiment of the invention, the telecommunication system SYST includes, located within the first transceiver TXi:
  spreading means DPLCT for spreading a stream of data Di to be transmitted through said communication channel Chi over a plurality of components,
  encoding means MC1 ... MCm ... MCM intended to multiply each of said components by a coded value Ci(1) ... Ci(m) ... Ci(M) forming part of a predetermined code word, for example a Walsh code word, and
  equalization means MW1 ... MWm ... MWM intended to multiply each of the components Ctj (for j=1 to M) outputted by the frequency spreading means MC1 ... MCm ... MCM by a predetermined equalization value Wi(j)* (for j=1 to M) representative of communication conditions within the communication channel Chi, where X* designates the complex conjugate of X.

The first transceiver TXi further includes a signal processing and transmitting stage TRS intended to recombine all components outputted by the equalization means MW1 ... MWm ... MWM and to transmit them in the form of a resulting signal Sgi towards the second transceiver RX.

The second transceiver RX includes a signal receiving and processing stage RCS able to receive signals Sg1 ... SgK from K different transceivers, among which the signal Sgi transmitted by the first transceiver TXi. The signal receiving and processing stage RCS is further able to differentiate each incoming signal Sgk (for k=1 to K) from all other received signals, and to split each differentiated signal into M components Crj (for j=1 to M), each of which being intended to be multiplied by a coded value Ci(j)* by means of a multiplier IMCj (for j=1 to M). The resulting components are then recombined by combination means CMB into a single data stream Edi constituted of estimates of the data Di originally transmitted by transceiver TXi.

In this embodiment of the invention, the equalization means MW1 ... MWm ... MWM included in the first transceiver TXi apply a pre-distortion to components of the signal Sgi to be transmitted by the first transceiver TXi, so that distortions generated by the communication channel Chi are significantly reduced beforehand by said pre-distortion.

To this effect, suitable equalization values will be computed by computing means not shown in this Figure, for example according to a so-called SINR technique disclosed in the above-mentioned publication authored by the inventors, and intended to maximize a signal-to-noise and interference ratio associated with the transmission through communication channel Chi.

According to this SINR technique, each equalization value $Wi(j)$ may be expressed as:

$$Wi(j) = \frac{\mu \cdot hi(j)}{(K-1) \cdot |hi(j)|^2 + M \cdot \sigma^2}$$

where $hi(j)$ is a coefficient representative of communication conditions within the communication channel computed on the basis of a study of a pilot signal previously received by the first transceiver TXi, where $\sigma^2$ represents a noise variance according to an Additive White Gaussian Noise (AWGN) model, and where $\mu$ is chosen such that:

$$\sum_{j=1}^{M} |Wi(j)|^2 = M$$

Other techniques may be used for computing the equalization values Wi(j), like a so-called MMSE technique aiming at reducing a minimum mean square error between the estimated data Edi and the original data Di, according to which MMSE technique each equalization value Wi(j) may be expressed as:

$$Wi(j) = \frac{\mu \cdot hi(j)}{K \cdot |hi(j)|^2 + M \cdot \sigma^2}$$

According to the present invention, the predetermined equalization values Wi(j) will also be representative of a Doppler effect resulting from a movement of the mobile transceiver TXi and adversely affecting the communication conditions within the communication channel Chi.

To this end, in the example depicted here, the predetermined equalization values Wi(j) further include an additionnal noise parameter $\sigma_d^2$ representative of said Doppler effect.

In this embodiment of the invention, equalization values Wi(j) formerly computed by using the SINR technique may thus be expressed as:

$$Wi(j) = \frac{\mu \cdot hi(j)}{(K-1) \cdot \left(|hi(j)|^2 + \frac{\sigma_d^2}{2}\right) + M \cdot \sigma^2}$$

while equalization values Wi(j) formerly computed by using the MMSE technique may be expressed as:

$$Wi(j) = \frac{\mu \cdot hi(j)}{K \cdot \left(|hi(j)|^2 + \frac{\sigma_d^2}{2}\right) + M \cdot \sigma^2}$$

In both expressions described above, the term $\sigma_d^2/2$ representative of the Doppler effect results from a second-order approximation of a Bessel function of the first kind of order 0, further referred to as $J_0$, and applied to $\sigma_d$, according to which approximation $J_0^2(\sigma_d) \sim 1 - \sigma_d^2/2$. In other embodiments of the invention, this Bessel function $J^0$ may be approximated to orders higher than 2, which will introduce further even powers of $\sigma_d$ in the above expressions.

The above described embodiments of the invention enable to adapt already existing computing algorithms, for example those currently used for implementing the SINR or MMSE techniques, for providing compensation of the Doppler effect, which will limit the increase in computing power required for implementing the present invention.

Figure 2:
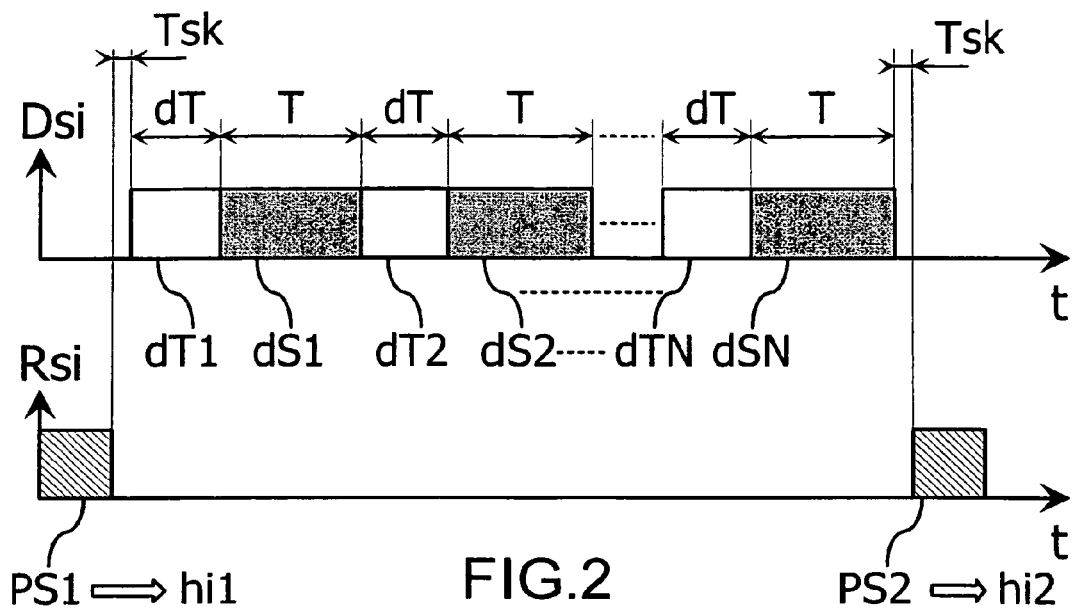
FIG. 2 is a set of chronograms, which schematically depict a data signal which may be transmitted by means of such a system, as well as pilot signals.

FIG. 2 is a set of chronograms depicting a data signal Dsi which may be transmitted by the above described first transceiver TXi, as well as a signal Rsi which may simultaneously be received by said first transceiver TXi. A first incoming pilot symbol PS1 is thus received before a stream of data symbols dS1 ... dSN is produced for transmission purposes, each data symbol having a time duration equal to T, a guard interval dTn being inserted before each data symbol dSn (for n=1 to N) in order to absorb interference generated by the previous data symbol dSn-1, as required for example by OFDM modulation standards. The data stream is followed by a second pilot symbol PS2. The incoming pilot symbols are separated from the stream of data symbols dS1 ... dSN to be transmitted by predefined time skews Tsk usually inserted between downlink and uplink signals.

An analyzis of the first incoming pilot symbol PS1 will enable the first transceiver TXi to compute a first set of channel coefficients hi1 modelizing the communication channel, which first set of channel coefficients hi1 will be used to compute equalization values such as those described above. This first set of channel coefficients hi1 will become more and more obsolete as time passes, so that the additionnal noise parameter $\sigma_d^2$ representative of said Doppler effect will advantageously feature a variance intended to increase with an amount of time elapsed since the last pilot signal, in this example PS1, has been received by the first transceiver.

To this end, the additionnal noise parameter $\sigma_d^2$ may be defined as being equal to $[2\pi.Fd.(Tsk+n.(T+dT))]^2$, where T is the time duration of a single data symbol dSn (for n=1 to N) and dT the time duration of a single associated guard interval dSn, Fd representing the Doppler frequency associated to the speed of the mobile transceiver.

In this first variant of the invention, the above definition of the additionnal noise parameter $\sigma_d^2$ will enable continuous updates of the equalization values Wi, which will in turn significantly reduce obsolescence of said equalization values and essentially preserve adequate compensation of alterations caused by the communication channel on signals passing through said channel.

Such continuous updates, however, require important computing power which may prematurely drain a battery supplying the energy needed by the transceiver for its operation. According to a second variant of the invention, the additionnal noise parameter $\sigma_d^2$ will feature a constant variance whose value will be averaged over a time interval between two successive pilot signals. In such a second variant, the additionnal noise parameter $\sigma_d^2$ may be defined as:

$$\sigma_d^2 = \frac{1}{N} \sum_{n=1}^{N} (2\pi \cdot Fd \cdot (Tsk + n(T + dT)))^2$$

This second variant of the invention, though slightly less accurate than the first one described above, will nevertheless enable an adequate compensation of the Doppler effect while requiring less computing power, i.e. only the computing power necessary for computing a single average value for the variance of the additional noise parameter $\sigma_d^2$ for each time interval N(T+dT)+2.Tsk between two successive pilot signals, for example PS1 and PS2.

As explained above, the equalization step included in the method according to the invention may be preemptively carried out by a mobile transceiver on components of a signal intended to be transmitted by said mobile transceiver.

Figure 3:
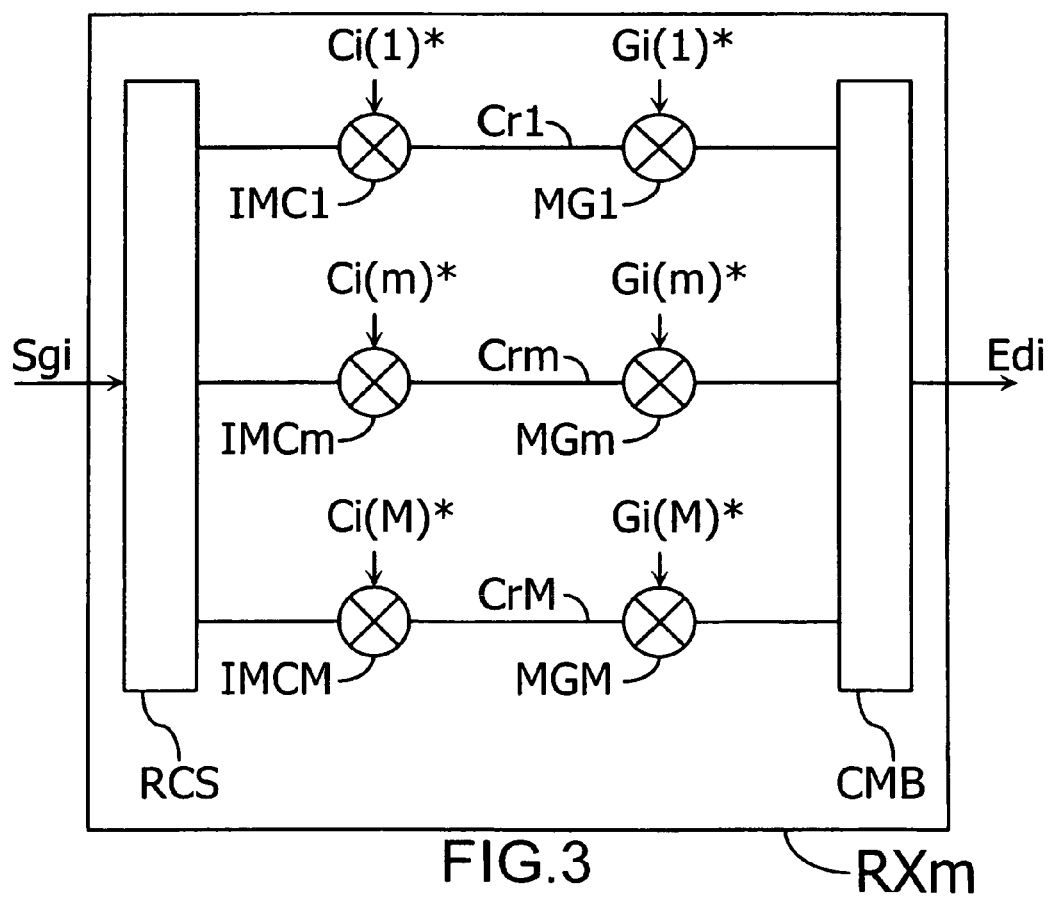
FIG. 3 is a block diagram, which schematically depicts a mobile transceiver according to a possible embodiment of the invention.

FIG. 3 depicts another mobile transceiver RXm which may, alternatively or cumulatively, carry out such an equalization step on components Crj (for j=1 to M) of a signal Sgi received by said mobile transceiver RXm, for example from a radio base station. Such a received signal may contain both data symbols and pilot symbols and may for example be construed as a superimposition of the signals Dsi and Rsi described above, in which the time skews Tsk will have disappeared, since all symbols are received through a same downlink channel. Additional guard intervals preceding the pilot symbols may have been inserted in the received signal Sgi.

In order to compensate for distortion actually generated by the communication channel through which said signal Sgi has been received, a mobile transceiver RXm similar to the second transceiver RX described in FIG. 1 further includes equalization means MG1 . . . MGm . . . MGM arranged downstream of the receiving stage RCS and intended to multiply each of the components Crj (for j=1 to M) outputted by the multipliers IMCj (for j=1 to M) by a predetermined equalization value Gi(j)* (for j=1 to M) representative of communication conditions within the communication channel Chi, on the one hand, and of the Doppler effect resulting from a movement of the mobile transceiver RXm and adversely affecting said communication conditions, on the other hand.

As explained above, such equalization values Gi(j)* may be computed by using the SINR technique and then be expressed as:

$$Gi(j)^* = \frac{\mu \cdot hi(j)}{(K-1) \cdot \left(|hi(j)|^2 + \frac{\sigma_d^2}{2}\right) + M \cdot \sigma^2}$$

while equalization values Gi(j)* computed by using the MMSE technique may be expressed as:

$$Gi(j)^* = \frac{\mu \cdot hi(j)}{K \cdot \left(|hi(j)|^2 + \frac{\sigma_d^2}{2}\right) + M \cdot \sigma^2}$$

where $\mu$ and $\sigma_d^2$ may be computed as described hereinbefore.

The invention claimed is:

1. A method for transmitting data in a telecommunication system that includes at least a first transceiver and a second transceiver linked together by means of at least one communication channel, at least one of the transceivers being mobile, the method comprising:
spreading said data over a plurality of components; and
an equalization step of multiplying each of the components resulting from the spreading step by a corresponding predetermined equalization value representative of communication conditions within the communication channel,
wherein at least one predetermined equalization value is determined so as to account for a Doppler effect resulting from a movement of the mobile transceiver, which adversely affects the communication conditions within the communication channel, wherein each predetermined equalization value is calculated using an equation that includes a parameter representative of a noise level in said communication channel and an additional noise variance representative of said Doppler effect; and
the additional noise variance representative of said Doppler effect increases with an amount of time elapsed since an incoming signal has been received by the mobile transceiver.

2. The method as claimed in claim 1, wherein the communication conditions within the communication channel are modeled by means of a study of the effects of said conditions on at least one incoming signal previously received by the mobile transceiver through said communication channel.

3. The method as claimed in claim 1, wherein the equalization step is performed by the mobile transceiver on components of a signal to be transmitted by said mobile transceiver.

4. The method as claimed claim 1, wherein the equalization step is performed by the mobile transceiver on components of a signal received by said mobile transceiver.

5. A telecommunication system including at least a first transceiver and a second transceiver linked together by means of at least one communication channel, at least one of the transceivers being mobile, the system comprising:
spreading means for spreading data to be transmitted through said communication channel over a plurality of components; and
equalization means for multiplying each of the components outputted by the spreading means by a corresponding predetermined equalization value representative of communication conditions within the communication channel,
wherein at least one predetermined equalization value is determined so as to account for a Doppler effect resulting from a movement of the mobile transceiver, which adversely affects the communication conditions within the communication channel;
wherein each predetermined equalization value is determined based on a parameter representative of a noise level in said communication channel and an additional noise variance representative of said Doppler effect; and
the additional noise variance representative of said Doppler effect increases with an amount of time elapsed since an incoming signal has been received by the mobile transceiver.

6. The telecommunication system as claimed in claim 5, wherein the communication conditions within the communication channel are modeled by means of a study of the effects of said conditions on at least one incoming signal previously received by the mobile transceiver through said communication channel.

7. A mobile transceiver to be included in a telecommunication system as claimed in claim 5, wherein the equalization means are arranged in the mobile transceiver upstream of a transmitting stage, and are configured to process components of a signal to be transmitted by said transmitting stage.

8. A mobile transceiver to be included in a telecommunication system as claimed in claim 5, wherein the equalization means are arranged in the mobile transceiver downstream of a receiving stage, and are configured to process components of a signal received by said receiving stage.

* * * * *